United States Patent
Tegt et al.

[11] 3,729,598
[45] Apr. 24, 1973

[54] EARPHONE RECEIVER ATTENUATION MEASUREMENT TECHNIQUE

[75] Inventors: Richard P. Tegt, Camarillo; Douglas G. Robertson, Oxnard; Thomas V. Blattel, Camarillo, all of Calif.

[73] Assignee: The United States of America as represented by the Secretary of the Navy

[22] Filed: Nov. 11, 1971

[21] Appl. No.: 197,863

[52] U.S. Cl. ..........................................179/175.1 A
[51] Int. Cl. ............................................H04r 29/00
[58] Field of Search ...................... 179/1 P, 1 C, 2 C, 179/175.1 A, 175; 181/0.5 AP

[56] References Cited
UNITED STATES PATENTS

| | | |
|---|---|---|
| 3,558,833 | 1/1971 | McCrory et al. ...............179/175.1 A |
| 3,594,506 | 7/1971 | Bauer....................................179/1 P |
| 3,254,739 | 6/1966 | Hardy................................181/.5 AP |
| 2,844,210 | 7/1958 | Milne ................................181/.5 AP |

*Primary Examiner*—Kathleen H. Claffy
*Assistant Examiner*—Douglas W. Olms
*Attorney*—Richard S. Sciascia et al.

[57] ABSTRACT

A system for measuring the effectiveness of the sound attenuating function of an earphone sound attenuation cover by employing the earphone transducer as a microphone and measuring the noise level with the ear cover in place on the user's ear and with the cover removed, the difference in decibels being interpreted as the acoustic attenuation provided by the ear cover.

3 Claims, 2 Drawing Figures

Patented April 24, 1973

3,729,598

RECEIVER/MICROPHONE   AMPLIFIER   READ-OUT 3,729,598

EARPHONE RECEIVER ATTENUATION MEASUREMENT TECHNIQUE

BACKGROUND OF THE INVENTION

The present invention relates to a means for measuring acoustic attenuation. The purpose is to enable the objective measurement in a noise field of acoustic attenuation and earseal fit afforded by devices such as aviator's protective helmets, communications receivers, ear defenders and hearing aid receiver earmolds in situ.

The probe tube method of measuring acoustic attenuation requires insertion of a probe tube by means of a micromanipulator into the external ear canal. The method requires time, effort and technical skill to place the subject in a head restrainer, insert the probe and obtain the measurement. The disadvantage of this method is that it is a laboratory method that does not lend itself to operational noise field situations.

The real ear attenuation at threshold technique is an indirect method of measuring acoustic attenuation involving a psychophysical measure of threshold shift in quiet. The results do not agree with other measures of acoustic attenuation in noise, and the method is indirect in that it measures threshold shift in quiet rather than acoustic attenuation and it is a psychophysical rather than direct objective measurement.

A system having a separate microphone outside the earphone ear cover to sample interfering noise, uses the noise signal to electronically control the loudness increasing or decreasing the volume as the noise level increases or decreases of the signal impressed upon the earphone so the user can hear the desired signal over surrounding noise. This system, however, does not measure the effectiveness of the earphone enclosure to attenuate or dampen unwanted noise.

SUMMARY OF THE INVENTION

In the present invention an earphone is employed as a microphone to measure acoustic attenuation and the degree of sealing-out of unwanted noise by the ear cover from the ear of the individual wearing the same. The output of the microphone is measured on a sound level meter, with the reading in decibels expressing the difference in acoustic attenuation between an in situ measurement and a measurement taken with the receiver-enclosure device removed from the ear. The invention is directed particularly to operational noise field situations which are present on a vehicle such as a helicopter having a high noise level.

DESCRIPTION OF THE PREFERRED EMBODIMENT

Figure 1:
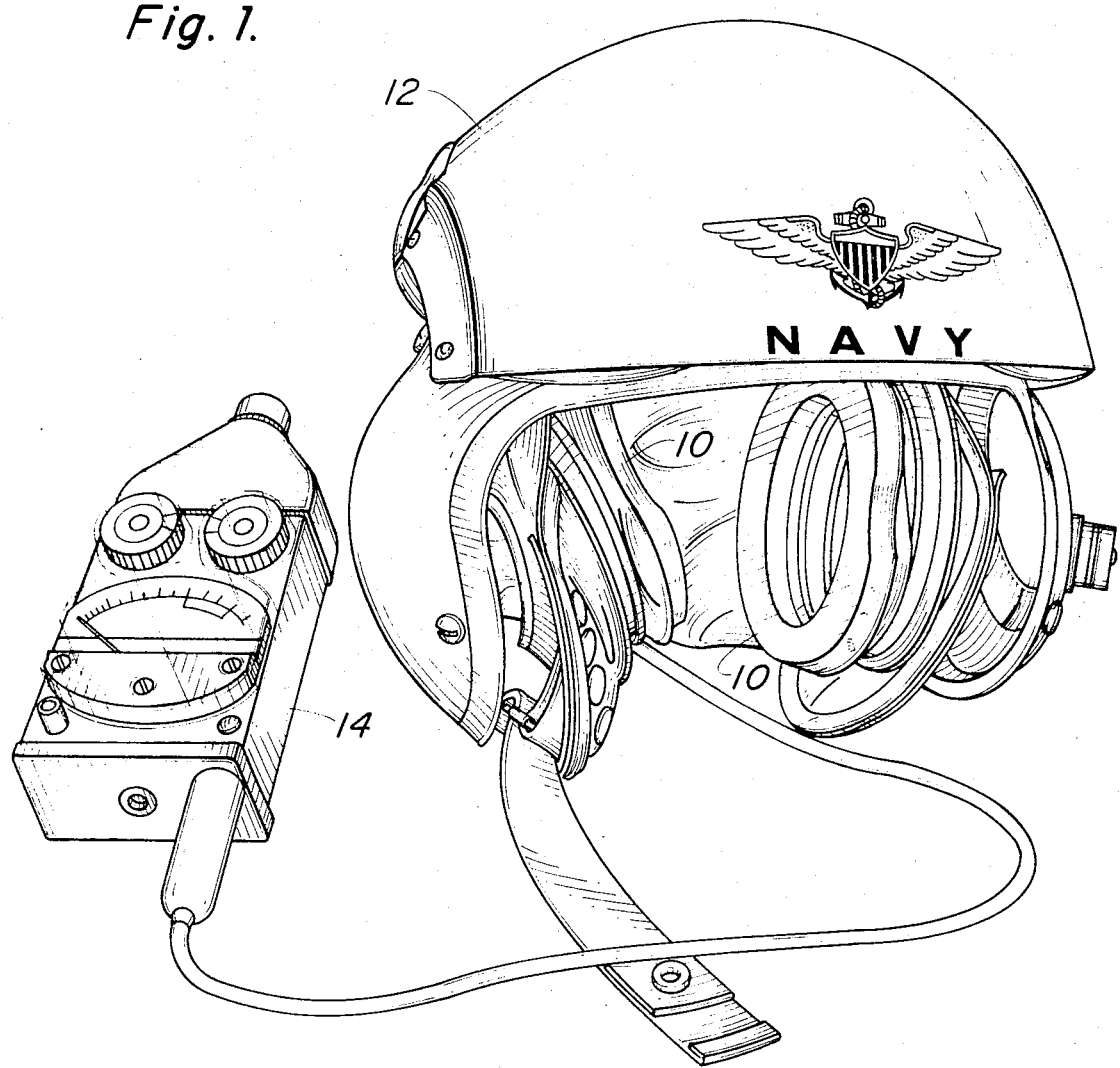
FIG. 1 shows a typical earphone set in a helmet with the earphones connected to decibel measuring equipment.

This invention employs an earphone as a microphone to measure the effectiveness of the sound attenuating or dampening function of ear cover 10 such as used in a pilot's helmet 12 as shown in FIG. 1. The noise level measured with the earphone cover over the ear is compared with a noise level measurement taken with the device removed from the ear. Measuring equipment 14 is connected directly to the earphone transducer within ear cover 10. The difference in the measured noise levels is a direct objective measure of the acoustic attenuation and the degree of earseal fit of the ear cover to the head of the user.

Figure 2:
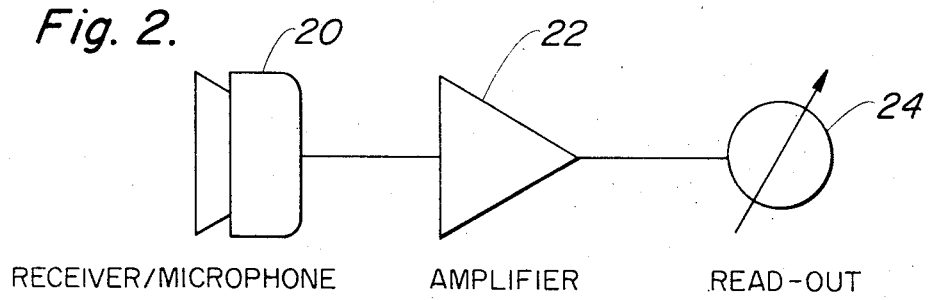
FIG. 2 is a simple circuit diagram showing a microphone/receiver, amplifier and decibel read-out device.

The system can be used in any noise field and does not require any response from the user, overt or covert. The basic components of the system are shown in FIG. 2; a microphone/receiver 20, an amplifier 22, and a read-out device 24. The microphone/receiver 20, i.e., transducer is mounted within ear cover 10 which is being tested for sound attenuation efficiency. The utilization of components in the system involves taking two objective measurements; a measurement of noise level in a noise field with an earphone device in situ over the ear and a measurement of noise level in a noise field with the earphone device removed from the ear. Read-out device 24 having a decibel scale facilitates reporting acoustic attenuation in the usual manner (attenuation in dB). As shown in FIG. 1, an aviator's protective helmet has its earphone plug connected to the circuit of a sound level meter. Readings in decibels express the difference measurement of acoustic attenuation between the in situ measurement and the measurement taken with the receiver device off the ear.

There are three-fold advantages to the present invention: the system provides a physical measure rather than a psychophysical measure, thus reducing error of measurement; a direct measurement of acoustic attenuation and degree of earphone earseal fit to the head is determined in situ in a noise field, and it is simpler than the probe tube method enabling attenuation determination in operational field conditions by unskilled personnel. Further, the system utilizes the earphone device employed as a microphone in a noise field for the purposes of measuring acoustic attenuation of the earphone enclosure and degree of enclosure earseal fit to the head, ear and/or external ear canal, thus eliminating any need for a separate microphone.

The noise level data can be transmitted in a variety of wired or wireless ways to a read-out device. Additionally, the read-out device can be programmed to indicate acceptance or rejection on some arbitrary scale, go or no go, or yes or no information. The technique can also be remoted to a central location monitoring multiple receiver devices singly, in groups or in combinations of groups. If desired, the amplifier/readout device can be modified to respond to only a portion of the noise spectrum, such as but not limited to low frequencies, octave or one-third octave bands or discrete pure tones.

Obviously many modifications and variations of the present invention are possible in the light of the above teachings. It is therefore to be understood that within the scope of the appended claims the invention may be practiced otherwise than as specifically described.

What is claimed is:

1. A method for measuring the sound attenuating effectiveness and seal fit of an earphone ear cover in a noise environment, comprising the steps of:

a. using an earphone as a microphone to transmit the noise level within the ear cover, first, with the ear cover in place on the user, and second, with the ear cover removed;

b. measuring the output transmitted by the transducer in both instances, the difference between the outputs being the acoustic attenuation provided by the ear cover.

2. A method as in claim 1 wherein the effectiveness of the sound attenuating function of said ear cover is read-out directly in decibels on a sound level measuring means.

3. A method as in claim 1 wherein said output level is measured by means responsive to select frequencies of the noise spectrum.

* * * * *